March 16, 1954  E. MURPHY  2,672,125
WATER TROUGH
Original Filed March 7, 1949

INVENTOR.
EMANUEL MURPHY
BY
Ross J. Woodward
ATTY.

Patented Mar. 16, 1954

2,672,125

UNITED STATES PATENT OFFICE 2,672,125

WATER TROUGH

Emanuel Murphy, Logansport, Ind.

Original application March 7, 1949, Serial No. 79,965. Divided and this application July 6, 1950, Serial No. 172,301

1 Claim. (Cl. 119—78)

This invention relates to a water trough which is particularly adapted for in supplying water to horses, cattle, and other animals, and the present application constitutes a division from my copending application filed March 7, 1949, Ser. No. 79,965 and issued as Patent No. 2,252,289 on January 13, 1953.

One object of the invention is to provide a water trough which is formed of sheet metal and consists of a main trough having associated with it an auxiliary trough located under the main trough and serving as a container for water to be consumed by small animals that cannot conveniently drink from the main trough.

Another object of the invention is to provide an auxiliary trough which is located under the main trough and filled with water poured through a chute mounted vertically in the main trough.

Another object of the invention is to so locate the auxiliary trough that while small animals will be able to readily drink therefrom large animals cannot conveniently do so and consume water intended for small animals.

Another object of the invention is to provide an auxiliary trough and filling chute that while water may be poured into the chute through the upper end thereof, water in the main trough cannot flow therefrom into the chute and supply of water for the auxiliary trough does not depend upon the level of water in the main trough.

Another object of the invention is to provide a drinking trough of this character which is of light weight, very strong, and capable of being manufactured at low cost.

The invention is illustrated in the accompanying drawings wherein.

This improved water supplying device has a main trough 1 and an auxiliary trough 2 which is disposed under one end portion of the main trough and projects from one side thereof. The main trough and the auxiliary trough are both preferably formed of sheet metal so treated that they will be rust proof, and since they are formed of sheet metal the water trough will be of light weight so that it may be easily lifted and carried from one place to another and at the same time very strong and capable of withstanding rough usage without being damaged.

Figure 1:
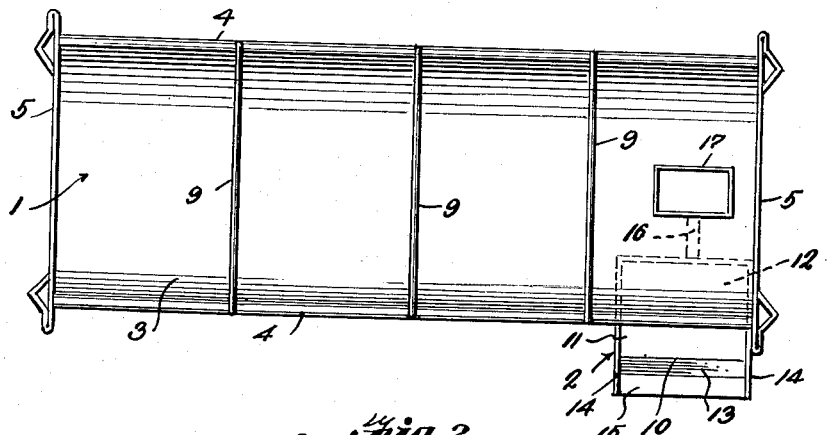
Fig. 1 is a top plan view of the improved trough.
Figure 2:
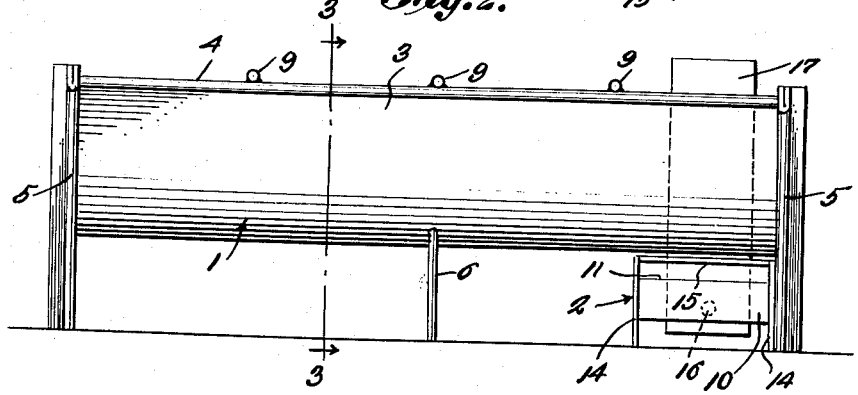
Fig. 2 is a side elevation of the trough.
Figure 3:
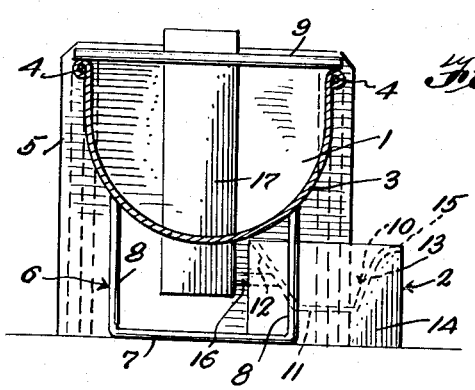
Fig. 3 is a transverse sectional view taken along the line 3—3 of Figure 2.
Figure 4:
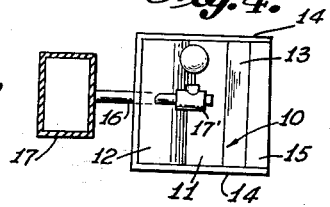
Fig. 4 is a fragmentary view showing the float valve which controls flow of water from the chute into the auxiliary trough.

The trough 1 has an elongated body 3 which is formed from a single blank of sheet metal and is U-shaped in cross section to provide the trough with side walls 3a merging into a transversely curved bottom 3b, as shown in Figure 3. Upper edges of the side walls are rolled outwardly to form beads 4 which reinforce the walls and provide them with smooth edges. The end walls 5 of the trough, which are formed of rectangular blanks of sheet metal, are welded to ends of the bottom and side walls of the body in order to provide strong water tight joints and are of greater width than the trough so that they project from opposite sides thereof. These end walls extend downwardly below the body and serve to support the body in upwardly spaced relation to the ground upon which the end walls rest. A brace 6 formed from a bent metal rod is located midway the length of the body and is disposed transversely thereof and has its bridge 7 resting upon the ground and its arms 8 extending upwardly from ends of the bridge and welded at their upper ends to the body. Rods 9 which extend across the body transversely thereof and are welded to upper edges of the side walls 3 and brace the body against spreading or inward bending. This trough is filled with water which is poured into it and as it is quite long and wide horses, cows, and other large animals may conveniently drink water from the trough.

The auxiliary trough is for use by small animals which cannot conveniently drink from the large main trough. This trough is also formed of sheet metal and has a body 10 formed with a flat bottom 11 and upwardly flaring inner and outer side walls 12 and 13 to which end walls 14 are welded. The end walls are of rectangular outline and of a width corresponding to the distance between upper edges of the side walls of the body 10. Upon referring to the drawings it will be seen that the upper edge portion of the outer side wall 13 is bent outwardly to form a lip 15 which provides this wall with an upper portion of such width and smoothness that a small animal may drink from the trough without its throat or other portions of its neck being scratched or cut by contact with the edge of the outer side wall of the trough. Since the auxiliary trough is located under the main trough with a portion of the main trough in overhanging relation to the auxiliary trough, thus allowing small animals to conveniently drink from the auxiliary trough but preventing large animals from conveniently drinking out of this trough. It will thus be seen that water in the auxiliary trough which is intended for small animals will not be consumed by large animals. As the end walls 14 extend downwardly below the bottom of the auxiliary trough and have their lower edges in level and parallel relation to lower edges of the end walls of the main trough and the bridge of the support 6, the body of the auxiliary trough will be supported in an elevated position as well as the body of the main trough water will not collect under the auxiliary trough and cause it to rust.

A tube 16 extends horizontally from the inner side wall of the auxiliary trough and is mounted through an opening formed in a side wall of a chute 17 which extends vertically in the main trough with its lower portion passing through and projecting downwardly from the bottom of the main trough and its upper portion projecting upwardly above the main trough. The bottom of the chute is spaced upwardly from the ground and its walls are welded to the bottom of the main trough about margins of an opening through which the chute passes. Therefore water cannot leak from the main trough about the chute. Since the upper portion of the chute projects above the main trough and the chute is open at its upper end water may be readily poured into the chute and flow from the chute through the pipe 16 to fill the auxiliary trough. If water overflows from the chute while filling it or is not accurately poured into the chute, it will be caught in the main trough. By providing a float controlled valve 17' for the pipe or tube 16 flow of water through it may be controlled and the chute used as a reservoir for the auxiliary trough. The fact that the chute projects upwardly above the main trough prevents water from being splashed into the chute from the main trough and flowing downwardly through the chute from the main trough and into the auxiliary trough. This prevents the pipe 16 from becoming clogged by trash floating upon water in the main trough as it cannot enter the chute.

Having thus described the invention, what is claimed is:

A horizontally disposed main trough of substantially semi-cylindrical form having end walls and being open along its top, said end walls being of greater width than the body and projecting laterally from opposite sides thereof and having portions extending downwardly therefrom and constituting ground-engaging supports maintaining the bottom of the body spaced upwardly from the ground, an auxiliary trough of substantially semi-cylindrical form disposed partially under one side of one end of the main trough having end walls, the end walls of the auxiliary trough being in planes substantially parallel with those of the main trough and extending downwardly below its body and constituting ground-engaging supports, said auxiliary trough having a side edge contacting the under surface of the main trough to one side of the longitudinal center thereof, the auxiliary trough projecting outwardly beyond the corresponding side of the main trough, a chute forming a reservoir disposed vertically in the main trough and having its upper end open and projecting above the sides of the main trough and its lower portion extending through the bottom of the main trough and provided with a bottom disposed above the plane of the bottom of the auxiliary trough, and a tube extending laterally from said chute adjacent the bottom thereof and communicating with the auxiliary trough through a side wall thereof, a valve in said tube and a control float therefor in the auxiliary trough.

EMANUEL MURPHY.

References Cited in the file of this patent

UNITED STATES PATENTS

| Number | Name | Date |
|---|---|---|
| 906,396 | Drake et al. | Dec. 8, 1908 |
| 1,632,842 | Liening | June 21, 1927 |
| 1,633,150 | Wieben | June 21, 1927 |
| 1,777,577 | Ritchie | Oct. 7, 1930 |
| 1,883,710 | Graham | Oct. 18, 1932 |
| 2,191,811 | Trampier | Feb. 27, 1940 |
| 2,254,585 | Travis | Sept. 2, 1941 |
| 2,498,981 | Darby | Feb. 28, 1950 |
| 2,532,999 | Donahoe et al. | Dec. 5, 1950 |